(12) United States Patent
Nilsson

(10) Patent No.: US 10,000,170 B2
(45) Date of Patent: Jun. 19, 2018

(54) BUMPER BEAM WITH EMBOSSED COVER

(71) Applicant: Gestamp Hardtech AB, Lulea (SE)

(72) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days. days.

(21) Appl. No.: 15/120,196

(22) PCT Filed: Mar. 5, 2014

(86) PCT No.: PCT/SE2014/050272
§ 371 (c)(1),
(2) Date: Aug. 19, 2016

(87) PCT Pub. No.: WO2015/133949
PCT Pub. Date: Sep. 11, 2015

(65) Prior Publication Data
US 2017/0066394 A1    Mar. 9, 2017

(51) Int. Cl.
*B60R 19/02* (2006.01)
*B60R 19/18* (2006.01)

(52) U.S. Cl.
CPC ............ *B60R 19/023* (2013.01); *B60R 19/18* (2013.01)

(58) Field of Classification Search
CPC .............................. B60R 19/18; B60R 19/023
See application file for complete search history.

(56) References Cited

U.S. PATENT DOCUMENTS

| 8,246,090 | B2 * | 8/2012 | Loveborn | B60R 19/18 293/102 |
|---|---|---|---|---|
| 2002/0180222 | A1 | 12/2002 | Janssen | |
| 2006/0028032 | A1 | 2/2006 | Henseleit | |
| 2010/0133859 | A1 * | 6/2010 | Lutke-Bexten | B60R 19/18 293/102 |

FOREIGN PATENT DOCUMENTS

| SE | 1300189 | 9/2014 |
|---|---|---|
| WO | WO 02/38418 | 5/2002 |
| WO | WO 2008/069717 | 6/2008 |

* cited by examiner

*Primary Examiner* — D Glenn Dayoan
*Assistant Examiner* — Melissa A Black
(74) *Attorney, Agent, or Firm* — Mark P. Stone

(57) ABSTRACT

A bumper beam is comprised of a hat-shaped profile (11) with a cover (12). The cover faces outward from the vehicle and has vertical depressions (21) at the locations of the fastening portions (18, 19) of the bumper beam, as well as horizontal depressions between said fastening portions. The sides (14, 15) of the hat-shaped profile have depressions directed in the longitudinal direction of the vehicle.

6 Claims, 2 Drawing Sheets

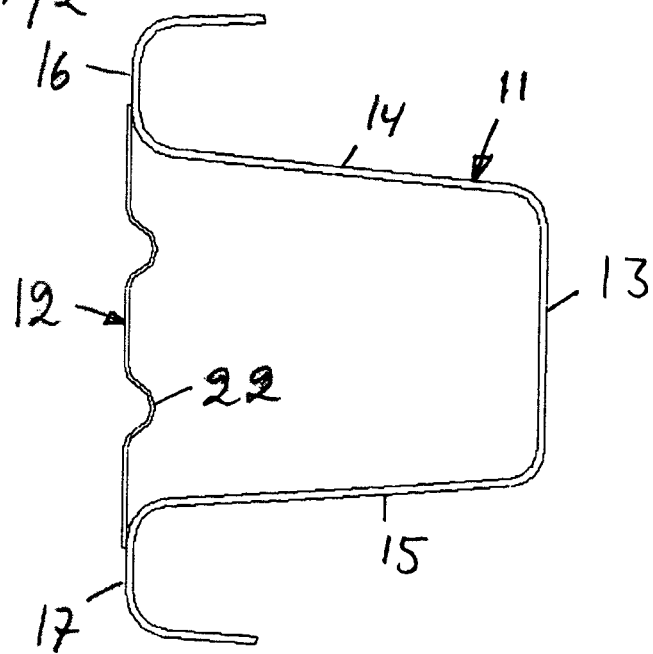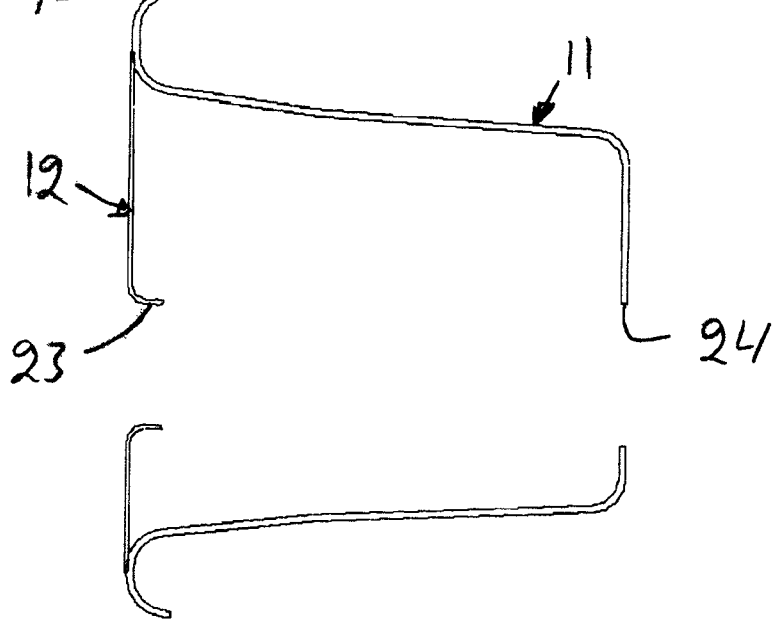

BUMPER BEAM WITH EMBOSSED COVER

AREA OF TECHNOLOGY OF THE INVENTION

The invention relates to a bumper beam having a hat-shaped profile with a central flange and sides which terminate in side flanges, wherein the central flange faces inward toward the vehicle and the side flanges face outward from the vehicle, and the hat-shaped profile has two fastening portions disposed against the vehicle and a cover which gives the bumper beam a closed profile.

BACKGROUND OF THE INVENTION

Bumper beams of the general type described supra are known from, e.g., WO2008/147276.

OBJECT OF THE INVENTION

An object of the invention is to increase the stress level for incipient plastic deformation of the bumper beam, without increasing the weight.

BRIEF DESCRIPTION OF THE INVENTION

The object of the invention is achieved by a bumper beam in which the cover has vertical depressions at the fastening portions. The invention is set forth in the patent claims.

BRIEF DESCRIPTION OF THE DRAWINGS

FIG. 2 is a cross section through line 2-2 of FIG. 1;
and
FIG. 3 is a cross section through line 3-3 of FIG. 1.

DESCRIPTION OF THE ILLUSTRATED PREFERRED EXEMPLARY EMBODIMENT OF THE INVENTION

Figure 1:
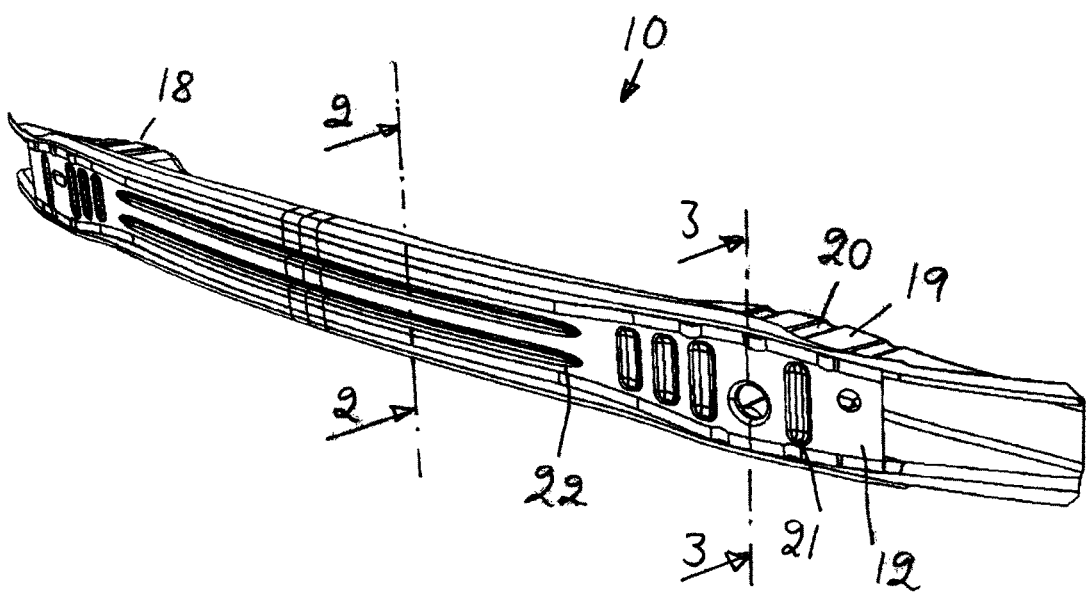
FIG. 1 is an isometric view of an inventive safety bumper beam.

The bumper beam 10 is comprised of a hat-shaped profile 11 and a cover 12. The hat-shaped profile has a central flange and two sides 14 and 15 which terminate in side flanges 16 and 17. The side flanges have backwards folded members. The cover is welded to the side flanges and gives the hat-shaped profile a closed cross section. The cross section of the hat-shaped profile varies along the length of the bumper beam.

The hat-shaped profile has two fastening portions 18 and 19 for fastening it to the vehicle, usually to the side rails of the vehicle. The fastening portions are disposed near the ends of the hat-shaped profile, i.e. at a distance apart, and they may have a mounting plate or a crash box welded to them, or may be affixed directly to the vehicle. At the fastening portions, the sides 14 and 15 have depressions 20 which extend in the longitudinal direction of the vehicle and serve to reinforce the sides. The cover 12 has vertical depressions 21 at the fastening portions. In the region between the fastening portions, the cover has horizontal depressions 22. The cover may have a hole 23 (as shown) for a towing eye, and it is not necessary that the cover extends over the hat-shaped profile on the outer edge regions beyond the fastening portions. The central flange 13 has a corresponding hole 24.

As best illustrated by FIG. 1 of the drawing, the cover includes at least one vertical depression 21 provided at each fastening portion 18, 19; at least two vertical depressions provided at at least one of the fastening portions 17, 18; and at least two vertical depressions provided at each fastening portion 17, 18. Additionally, the horizontal depressions 22 extend continuously along the cover between the fastening portions 17,18.

When collision stress is experienced, the vertical depressions 21 in the cover oppose the tendency of the cover to bend inward at the fastening portions and for the sides 14 and 15 to fold toward each other. Thereby plastic deformation of the fastening portions is delayed. Accordingly, the fastening portions accept larger stresses before beginning to plastically deform.

The depressions 20 in the sides serve to stiffen the sides so that they can accept higher stresses before beginning to buckle.

The bumper beam is curved as viewed from above, and the horizontal depressions in the cover counteract local buckling when the bumper beam is straightened out in a collision. The stress level increases sharply and the cross to section is retained longer, causing the collision stress to be transferred to the fastening portions until they begin to plastically deform and plastically absorb the impact energy.

The invention claimed is:

1. A bumper beam comprising a hat-shaped profile (11) with a central flange (13) and sides (14, 15) which terminate in side flanges (16, 17), wherein the central flange faces inward toward the vehicle and the side flanges face outward from the vehicle, and wherein the hat-shaped profile has two fastening portions (18, 19) against the vehicle disposed at a distance from each other, and a cover (12) which gives the bumper beam a closed profile;
    wherein the cover (12) has at least two elongate depressions (21) at at least one of the fastening portions (18, 19), the major portion of each of said elongate depressions extending primarily in a vertical direction relative to said bumper beam.

2. A bumper beam according to claim 1, wherein the cover (12) has at least one horizontal depression (22), said at least one horizontal depression extending continuously between the fastening portions (18, 19).

3. A bumper beam according to claim 1, wherein the sides (14, 15) of the hat-shaped profile have depressions (20) at the fastening portions extending in the longitudinal direction of the vehicle.

4. A bumper beam according to claim 2, wherein the sides (14, 15) of the hat-shaped profile have depressions (20) at the fastening portions extending in the longitudinal direction of the vehicle.

5. A bumper beam according to claim 1, wherein the cover (12) has at least two said elongate depressions (21) at each of the fastening portions (18, 19).

6. A bumper beam comprising a hat-shaped profile (11) with a central flange (13) and sides (14, 15) which terminate in side flanges (16, 17), wherein the central flange faces inward toward the vehicle and the side flanges face outward from the vehicle, and wherein the hat-shaped profile has two fastening portions (18, 19) against the vehicle disposed at a distance from each other, and a cover (12) which gives the bumper beam a closed profile;
    wherein the cover (12) has at least one elongate depression (21) at each of the fastening portions (18, 19), the major portion of each said elongate depression extending primarily in a vertical direction relative to said bumper beam.

* * * * *